United States Patent [19]

Boehmer

[11] Patent Number: 4,525,910

[45] Date of Patent: Jul. 2, 1985

[54] RESILIENT TIPPED NEEDLE VALVE

[75] Inventor: Dennis A. Boehmer, Xenia, Ohio

[73] Assignee: Vernay Laboratories, Inc., Yellow Springs, Ohio

[21] Appl. No.: 520,976

[22] Filed: Aug. 8, 1983

[51] Int. Cl.³ .............................................. F16K 1/34
[52] U.S. Cl. .......................... 29/156.7 R; 29/157.1 R; 264/162; 251/357; 251/368; 251/DIG. 4
[58] Field of Search ................. 251/357, DIG. 4, 368; 29/157.1 R, 157.1 A, 156.7 R; 264/162; 137/1

[56] References Cited

U.S. PATENT DOCUMENTS

| Re. 25,560 | 4/1964 | Gifford | 29/157.1 R |
|---|---|---|---|
| 2,414,577 | 1/1947 | Adair et al. | 137/434 |
| 3,086,750 | 4/1963 | Carlson et al. | 251/358 |
| 3,090,596 | 5/1963 | Gifford | 251/333 |
| 3,155,367 | 11/1964 | Gifford | 251/86 |
| 3,326,521 | 6/1967 | Murray | 251/358 |
| 3,440,313 | 4/1969 | Schmocker | 264/162 |
| 3,445,089 | 5/1969 | Murray | 560/256 |
| 3,581,365 | 6/1971 | Murray | 29/157.1 R |
| 4,196,886 | 4/1980 | Murray | 251/357 |
| 4,336,920 | 6/1982 | Murray | 251/357 |

Primary Examiner—A. Michael Chambers
Attorney, Agent, or Firm—Biebel, French & Nauman

[57] ABSTRACT

A needle valve is formed by molding a resilient tip to a rigid body having a tip receiving cylindrical portion or barrel which includes tip retaining means for securing the resilient tip thereto. The tip is then ground until the outer edge of the barrel is engaged to form a resilient single angle or simple conical tip to thereby eliminate distortions which may be present in the molded tip. The tip retaining means comprises either a socket formed into the distal end of the barrel or a mushroom-shaped bayonet projection extending therefrom.

5 Claims, 7 Drawing Figures

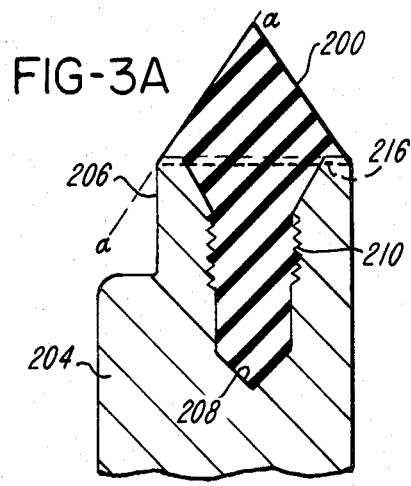
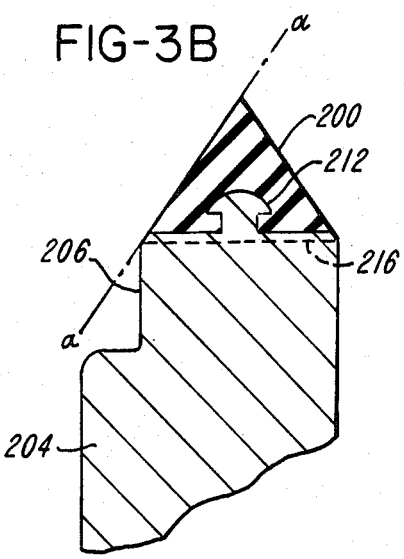
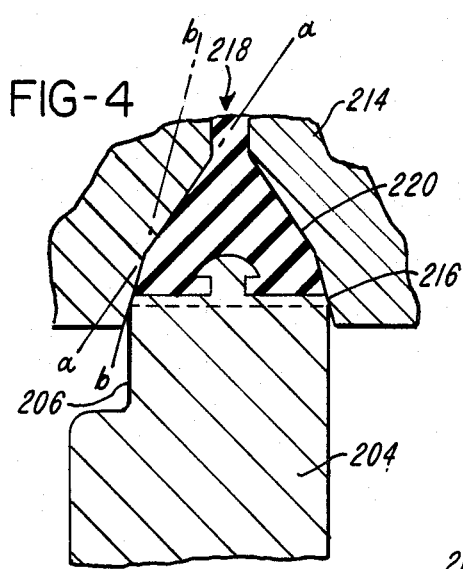
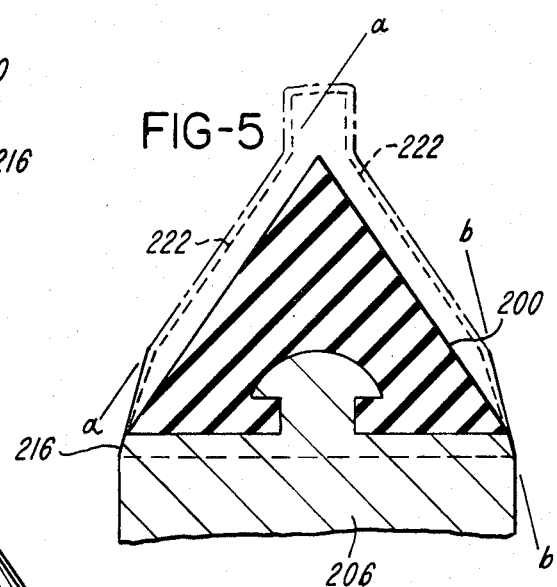
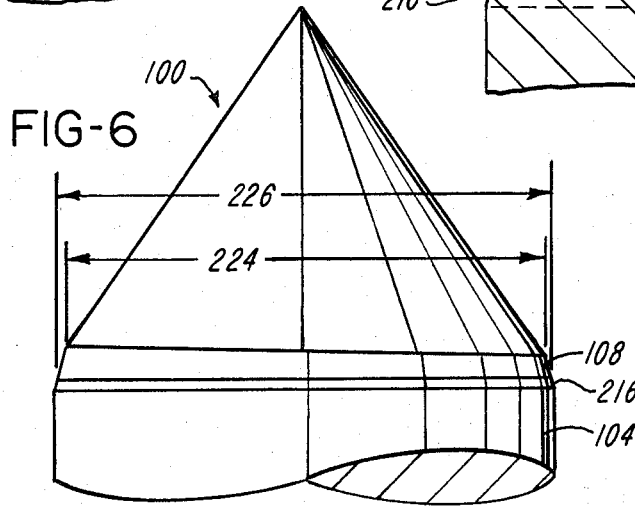

RESILIENT TIPPED NEEDLE VALVE

BACKGROUND OF THE INVENTION

This invention relates generally to resilient tipped needle valves and, more particularly, to a needle valve having a simple conical rubber tip which is formed by grinding a molded rubber tip until a tip support is engaged.

Rubber tipped needle valves comprising generally conical rubber tips molded to rigid valve bodies are known in the prior art. The rubber tips are typically secured to the bodies by being molded to engage either sockets formed into the rigid bodies or mushroom-shaped projections, sometimes referred to as bayonets, extending therefrom. Difficulties have been encountered in the use of these valves primarily due to distortion of the rubber tip caused by shrinkage of the rubber after the tip is molded. Distortion of the molded rubber tip has been dealt with most effectively by grinding the conical end of the rubber tip.

In the prior art, rubber tips have been molded in a compound shape such that they can be ground without engaging the rigid valve bodies which are typically formed from metals including aluminum, brass, steel and stainless steel as well as various plastics. The compound shape, for example, can comprise a right cylindrical inner portion and an outer portion of truncated cone shape as shown in U.S. Pat. Nos. 2,414,577 and 3,440,313. Alternately, the inner portion may be formed as a conical section having a first apex angle and the outer portion formed as a conical section being a second apex angle which is greater than the first apex angle as shown in U.S. Pat. No. Re. 25,560. Preferably, the second apex angle is at or near the desired angle of the conical tip to be ground.

Such ground rubber tipped needle valves substantially overcome the problems associated with distortions of a molded rubber tip; however, they suffer from other shortcomings. For example, the use of a compound shaped tip, particularly the double angled configuration, reduces the maximum gauge or sealing diameter for a given valve body. In addition, grinding the end of a compound shaped tip can result in a cosmetic defect in the appearance of the needle valve.

The cosmetic defect results due to machining tolerances and because the distortion at the base of the molded rubber tip is nonuniform around the circumference of the base. Cylindrical tip retaining extensions, referred to as barrels, are machined at the end of the valve bodies. Machining tolerances result in the barrels being eccentric relative to the axis of the valve body. When the tip end is ground to the desired angle, the eccentricity of the barrel and the uneven distortion of the molded rubber tip make the unground base portion of the tip vary in width as one progresses around the valve. This varying width leads to the cosmetic defect which is an uneven banded appearance at the base of the tip.

While this uneven banded appearance does not affect the operation of the needle valve, upon visual examination it appears to be a defect which suggests improper concentricity of the conical rubber tip or an eccentric grind of the tip. Hence, such needle valves, although perfectly good, may be rejected as being defective.

Accordingly, the need exists for an improved rubber tipped needle valve which overcomes these problems and provides an increased gauge or sealing diameter for a given needle valve body.

SUMMARY OF THE INVENTION

In accordance with the present invention, a needle valve is formed by molding a resilient tip to a rigid body having a tip receiving cylindrical portion or barrel which includes tip retaining means for securing the resilient tip thereto. The tip is then ground until the outer edge of the barrel is engaged to form a resilient single angle or simple conical tip and eliminate distortions which may be present in the molded tip. The tip retaining means comprises either a socket formed into the distal end of the barrel or a mushroom-shaped projection extending therefrom.

Preferably, the barrel includes a frustoconical peripheral edge formed at its distal end during the tip molding operation. The resilient tip is ground until the peripheral edge is engaged such that molding distortions in the surface of the resilient tip are eliminated. Alternately, the peripheral edge of the cylindrical portion of the rigid body may be ground until the resilient tip and the peripheral edge are in alignment with one another.

By grinding the molded tip at least until the peripheral edge of the barrel is engaged, an undistorted single angle or simple conical resilient tip for the needle valve is ensured, the prior art cosmetic defects are eliminated and an increased gauge or sealing diameter is provided. Preferably, the molded tip is substantially conical in shape to minimize the grinding necessary to form the needle valve in accordance with the present invention.

It is, therefore, an object of the present invention to provide an improved needle valve having a rigid body with a resilient undistorted conical tip molded to a cylindrical portion of the rigid body with any molded tip distortion being eliminated by grinding the tip until a frustoconical peripheral edge of the cylindrical portion is engaged, is ground to partially remove the peripheral edge or is ground until the peripheral edge is formed to align with the resilient tip.

Other objects and advantages of the invention will be apparent from the following description, the accompanying drawings and the appended claims.

BRIEF DESCRIPTION OF THE DRAWINGS

FIG. 3A is a fragmented cross-sectional view of a needle valve as shown in FIG. 2 illustrating a socket tip retaining arrangement.

FIG. 3B is a fragmented cross-sectional view of a needle valve as shown in FIG. 2 illustrating a bayonet tip retaining arrangement.

FIG. 4 is a fragmentary cross-sectional view of a needle valve having a tip retaining socket with a tip mold shown engaged therewith.

FIG. 5 is a fragmentary cross-sectional view of a needle valve illustrating deformation of an as-molded rubber tip.

FIG. 6 is a side view of the upper rubber tipped portion of a prior art needle valve showing the reduced gauge or sealing diameter of the prior art needle valve.

DETAILED DESCRIPTION OF THE INVENTION

Figure 1:
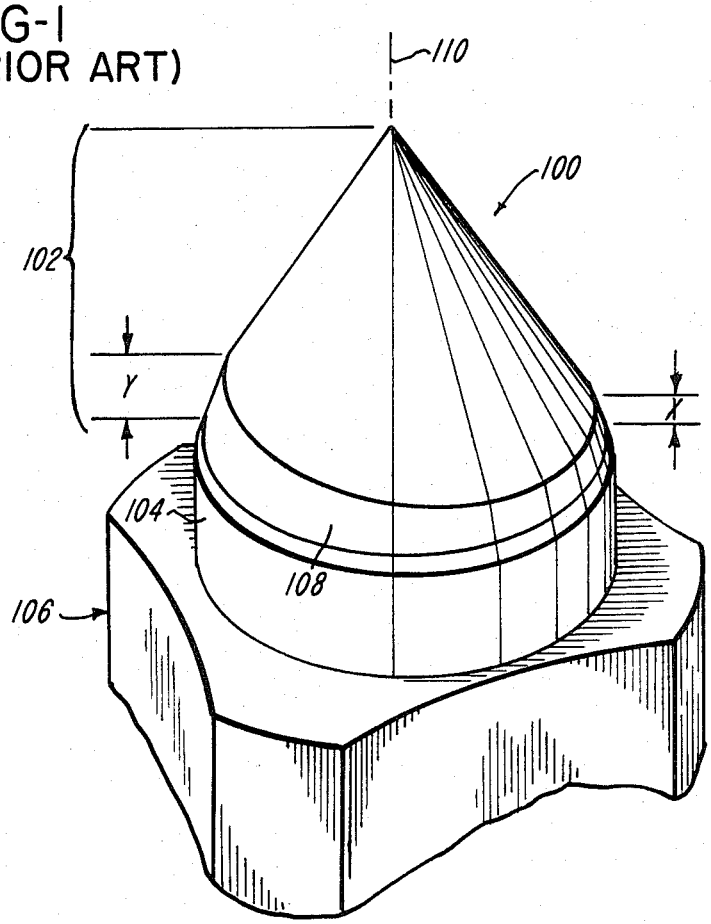
FIG. 1 is a perspective view of the upper rubber tipped portion of a prior art needle valve showing a cosmetic defect resulting from grinding only the end of a compound shaped tip.

FIG. 1 illustrates a prior art rubber tipped needle valve wherein the conically tipped end 100 of the rubber tip 102 is formed by grinding which avoids contact with a tip retaining cylindrical portion or barrel 104 of a rigid body 106. In such prior art needle valves, an unground section or band 108 extends between the barrel 104 and the ground conically tipped end 100.

Due to machining tolerances in manufacture of the rigid valve body 106, the barrel 104 normally is not perfectly concentric with the axis 110 of the valve body 106. Also, when the molded rubber tip 102 cures, there is a certain amount of shrinkage of the rubber leading to deformation of the molded tip.

Tip deformation is dependent upon a number of variables including the bonding of the tip to the rigid body, the composition of the tip, curing temperatures and the like. As is to be expected, the deformation also is not uniform or even around the base of the molded rubber tip. Hence, the band 108 of unground rubber around the base of the tip can vary in width as shown in somewhat exaggerated form in FIG. 1, from a minimum width x to a maximum width y as one progresses around the tip. As previously noted, this variation is due to uneven deformation of the molded tip and also the eccentricity of the barrel 104 relative to the axis 110 of the rigid valve body 106.

While the ground conical tip 100 may be axially aligned with the axis 110 of the rigid valve body 106, it appears to be eccentrically ground or to not be concentric with the axis 110 due to the varying width of the band 108 of unground rubber. Such valves perform properly; however, they may be rejected as defective due to this cosmetic defect in the needle valve.

In accordance with the present invention, a rigid valve body includes a tip receiving cylindrical portion or barrel having a tip retaining socket formed thereinto or a tip retaining bayonet extending therefrom. The body is formed in one of any number of conventional configurations and typically constructed of a plastic material or one of the metals aluminum, brass, steel or stainless steel. The distal end of the barrel is swaged slightly in the molding operation to eliminate flash and to form a frustoconical angled peripheral edge. The tip is molded to the barrel and is formed such that the molded tip surface, after deformation due to shrinkage, extends beyond the desired surface of the ground rubber tip such that the deformation can be removed by grinding.

After being cured, the molded tip is ground to the desired angle. The tip is ground at least until the peripheral edge of the barrel is engaged by the grinding wheel and may be ground until the peripheral edge and the conical rubber tip are in alignment. The exact point of grind is determined by the desired overall length of the resulting needle valve. Hence, the length of the rigid body can be adjusted to obtain a desired appearance for a given needle valve. In this way, a resilient undistorted conical tip is formed on the barrel of the valve body to provide an improved appearance and an increased gauge or sealing diameter for the given needle valve body.

Figure 2:
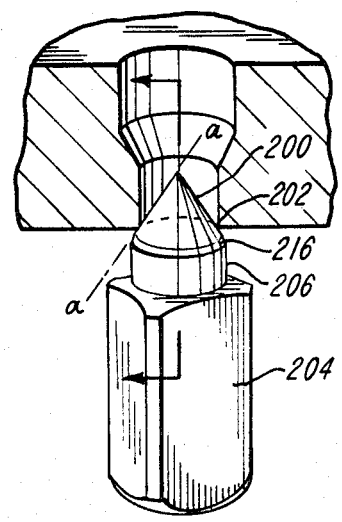
FIG. 2 is a perspective view of a rubber tipped needle valve in accordance with the present invention engaged with a valve seat.

A needle valve in accordance with the present invention is shown in FIG. 2 with the ground rubber tip 200 engaging a valve seat 202. The needle valve comprises a rigid body 204 with a machined cylindrical barrel 206 extending axially from the body 204 for receiving the rubber tip 200.

Two commonly used tip retaining means are shown in FIGS. 3A and 3B. In FIG. 3A, the tip 200 is retained in the body 204 by means of a socket 208 having internal threads 210 formed thereinto. The socket 208 may be tapered at its mouth as shown in FIG. 3A. FIG. 3B shows retention of the rubber tip 200 by means of a mushroom-shaped projection sometimes referred to as a bayonet 212. Both of these tip retaining structures are known and commonly used in the manufacture of rubber tipped needle valves.

FIG. 4 shows a fragmentary section of a preferred double angled mold 214 which is used to mold a rubber tip onto the valve body 204. The mold cavity engages over and swages the barrel 206. Swaging the barrel 206 also prevents the formation of flash which otherwise may be produced by molding the rubber tip to the body 204 and also forms an angled peripheral edge 216 on the barrel 206. The mold 214 has a sprue hole 218 through which the rubber material is injected.

As shown in FIG. 4, the mold 214 forms a generally conical double angled molded tip 220 which has a first apex angle b—b aligned with the peripheral edge 216 of the barrel 206 and a second, greater apex angle a—a corresponding to the angle of the finally ground tip 200. The preferred double angled molded tip 220 ensures that any deformation of the outer surface of the tip 220 will not extend internally to the desired ground surface of the finished tip 200 of the needle valve. Potential deformation of the molded tip 220 is shown by the dotted line 222 of FIG. 5. Of course, it is to be understood that any molded tip having a final surface area extending beyond the desired ground surface of the finished tip 200 could be utilized in accordance with the present invention.

After the molded tip has cured, it is ground at least until the peripheral edge 216 is engaged by the grinding wheel as previously described. Minimal grinding of the peripheral edge 216 is shown in FIG. 5 where the peripheral edge 216 remains substantially at the swaged angle b—b while the rubber tip 200 has been ground to the desired angle a—a. Grinding of the peripheral edge 216 to align with the rubber tip 200 is shown in FIGS. 2, 3A and 3B. Of course, it is to be understood that these two grinds as well as grinds therebetween may be performed in accordance with the present invention and may be selected by adjustments in the length of the needle valve body 204.

While the cosmetic defect described previously with respect to the prior art and shown in FIG. 1 may be transferred to the peripheral edge 216 of the needle valve in accordance with the present invention, the dimensions of any such cosmetic defect are greatly reduced. Accordingly, needle valves of the present invention should not be inappropriately rejected as being defective. Furthermore, since the grind extends to and includes at least a portion of the peripheral edge 216 of the barrel 206, such needle valves provide an increased gauge or sealing diameter for the given body 204.

The increased gauge or sealing diameter of the needle valves in accordance with the present invention is apparent from a review of FIG. 6. The maximum sealing diameter of the prior art needle valve as shown in FIG. 6 is limited to the diameter 224 of the ground portion 100 of the tip. By grinding the tip until at least the peripheral edge 216 is engaged, the sealing diameter of the valve is increased to the expanded diameter 226 of the entirely ground tip which is less than, but substantially equal to, the diameter of the barrel 104.

Of course, the present invention is equally applicable to needle valves wherein the resilient tip is formed as a truncated cone. Further, the term needle valve as used herein should be interpreted as applying to solenoid armatures and/or any other types of apparatus utilizing conical or frustum control forms of a resilient material for valving functions.

While the method and apparatus described herein constitute preferred embodiments of the invention, it is to be understood that the invention is not limited to this precise method and apparatus and that changes may be made therein without departing from the scope of the invention which is defined in the appended claims.

What is claimed is:

1. A method of making a needle valve having a rigid body and a resilient conical tip, said method comprising the steps of:
    providing a rigid body having a tip receiving cylindrical part extending axially from one end thereof, said cylindrical part including tip retaining means;
    molding a resilient, substantially conical tip onto said cylindrical part, said tip engaging said tip retaining means to secure said tip to said cylindrical extension; and
    grinding said tip until the outer edge of said cylindrical part of said rigid body is engaged to remove a portion thereof to form a single angle conical tip having a base dimension substantially equal to the diameter of the removed portion of said cylindrical part whereby any molding distortions of said tip are eliminated to assure a sealing diameter substantially equal to the base dimension of said single angle conical tip.

2. A method as claimed in claim 1 further comprising the step of bonding said tip to said tip retaining means.

3. A method of making a needle valve having a rigid body and a resilient conical tip, said method comprising the steps of:
    providing a rigid body terminating at one edge in a tip receiving cylindrical part having tip retaining means for securing a resilient tip thereto;
    engaging a mold to said rigid body to swage the distal end thereof from an angled peripheral edge;
    molding a resilient tip to said cylindrical part of said rigid body, the surface of said resilient tip extending beyond the desired surface of said resilient conical tip; and
    grinding said resilient tip until said peripheral edge of said rigid body is engaged to remove a portion thereof to form said resilient conical tip whereby any molding distortions of said molded resilient tips are eliminated.

4. A method as claimed in claim 3 wherein said grinding step is performed until said resilient tip and said peripheral edge are in alignment with one another.

5. A method as claimed in claim 4 further comprising the step of bonding said tip to said tip securing means.

* * * * *